(12) United States Patent
Hensley (10) Patent No.: US 6,999,913 B2
(45) Date of Patent: Feb. 14, 2006

(54) EMULATED READ-WRITE DISK DRIVE USING A PROTECTED MEDIUM

(76) Inventor: John Alan Hensley, 12421 Hardee Rd., Raleigh, NC (US) 27614-9234

( * ) Notice: Subject to any disclaimer, the term of this patent is extended or adjusted under 35 U.S.C. 154(b) by 401 days.

(21) Appl. No.: 10/315,797

(22) Filed: Dec. 10, 2002

(65) Prior Publication Data

US 2004/0111250 A1 Jun. 10, 2004

(51) Int. Cl.
*G06F 9/455* (2006.01)
*G06F 13/00* (2006.01)

(52) U.S. Cl. .......................... 703/25; 703/24; 719/322; 719/326

(58) Field of Classification Search ................... 703/25, 703/24; 719/322, 326; 707/205, 202
See application file for complete search history.

(56) References Cited

U.S. PATENT DOCUMENTS 5,087,164 A * 2/1992 Mukaimoto ................. 414/282
5,193,184 A    3/1993 Belsan et al.

(Continued)

FOREIGN PATENT DOCUMENTS

WO    WO 97/44727    7/1997

OTHER PUBLICATIONS

Sarah V. Hart, "Test Results for Disk Imaging Tools: dd GNU fileutils 4.0.36, Provided with Red Hat Linux 7.1" U.S. Department of Justice, National Institute of Justice, Aug. 2002, pp. 1–57.*

"El Torito" Bootable CD–ROM Format Specification Version 1.0, Jan. 25, 1995; Curtis E. Stevens, Phoenix Technologies (20 pages).

Internet article entitled "Enhanced Write Filter"; Microsoft Windows XP Embedded; ms–help://MS.MSDNQTR.2002JUL.1033/xpehelp/htm/xeconEnhancedWriteFilter.htm (10 pages).

*Primary Examiner*—Kevin J. Teska
*Assistant Examiner*—Dwin M. Craig
(74) *Attorney, Agent, or Firm*—Coats & Bennett, P.L.L.C.

(57) ABSTRACT

A read-write hard disk drive is emulated using a hard disk drive image file on a protected medium such as a CD-ROM, a written disk sector database, and file system filters. A file system filter intercepts file I/O requests from the operating system. Initial read requests are serviced from the hard disk drive image file. Write operations are directed to a database, such as in RAM. Subsequent read requests for previously written data are serviced from the database. Another file system filter monitors attempts to alter the file access attributes, and prevents pre-existing read-only files on the emulated drive from being written or deleted. The maximum size of the written disk sector database is the sum of sectors on the hard disk drive image file allocated to read-write files and free space. The emulated read-write hard disk drive allows for the execution of programs requiring a read-write native media.

15 Claims, 7 Drawing Sheets

U.S. PATENT DOCUMENTS

| | | | |
|---|---|---|---|
| 5,418,918 A | | 5/1995 | Vander Kamp et al. |
| 5,546,585 A | | 8/1996 | Soga |
| 5,627,964 A | | 5/1997 | Reynolds et al. |
| 5,652,868 A | | 7/1997 | Williams |
| 5,752,005 A | | 5/1998 | Jones |
| 5,761,169 A | * | 6/1998 | Mine et al. ............... 369/84 |
| 5,787,466 A | | 7/1998 | Berliner |
| 5,832,263 A | | 11/1998 | Hansen et al. |
| 5,960,460 A | * | 9/1999 | Marasco et al. ............ 711/162 |
| 5,991,542 A | | 11/1999 | Han et al. |
| 6,035,395 A | | 3/2000 | Saito |
| 6,101,504 A | * | 8/2000 | Gord ........................ 707/201 |
| 6,122,734 A | | 9/2000 | Jeon |
| 6,170,055 B1 | | 1/2001 | Meyer et al. |
| 6,173,417 B1 | | 1/2001 | Merrill |
| 6,256,711 B1 | | 7/2001 | Berliner |
| 6,263,378 B1 | | 7/2001 | Rudoff et al. |
| 6,279,109 B1 | | 8/2001 | Brundridge |
| 6,304,965 B1 | | 10/2001 | Rickey |
| 6,317,845 B1 | | 11/2001 | Meyer et al. |
| 6,334,149 B1 | | 12/2001 | Davis, Jr. et al. |
| 6,356,915 B1 | | 3/2002 | Chtchetkine et al. |
| 6,366,988 B1 | * | 4/2002 | Skiba et al. ................ 711/165 |
| 6,370,641 B1 | | 4/2002 | Maia |
| 6,401,140 B1 | | 6/2002 | Wu |
| 6,463,509 B1 | * | 10/2002 | Teoman et al. ............. 711/137 |
| 6,715,043 B1 | * | 3/2004 | Stevens ...................... 711/154 |

* cited by examiner

EMULATED READ-WRITE DISK DRIVE USING A PROTECTED MEDIUM

BACKGROUND OF THE INVENTION

The present invention relates generally to the field of computers, and specifically to an emulated read-write disk drive implemented using a protected medium.

Protected, or read-only media devices, such as CD-ROM and DVD-ROM, have become ubiquitous parts of modern computer systems, with a CD-ROM and/or DVD-ROM drive standard equipment on the vast majority of computers. In addition, CD-ROM and DVD-ROM "burners," or drives capable of writing data to these traditionally read-only media, have proliferated to the extent that nearly all personal computer manufacturers offer a CD-ROM burner or DVD-ROM burner as standard equipment on the machines they sell. The drives are additionally available as peripheral equipment, communicating with the computer via a variety of interfaces such as IDE, SCSI, and the like.

A cost effective means for a computer user to safely archive large quantities of computer programs and data is to use a CD-ROM or DVD-ROM burner and save the data onto Write Once Read Many (WORM) media, or alternatively, a "re-writable" media. In either case, after data has been burned onto the CD-ROM or DVD-ROM and the media session has been closed, the data is protected from any changes and will appear as a read-only disk to the computer's host operating system and to the computer user.

While archiving data in a read-only format on protected media is cost effective, it imposes fundamental limitations on the way the archived data may be used. The standard file-system formats used on CD-ROM and DVD-ROM media were designed with characteristics specific to read-only media. For example, they limit direct use of data archived on the media to computer programs that were explicitly written to work with read-only files. As such, programs that rely on native file-system security features unable to directly use files archived on protected media. The read-only characteristics of protected media also preclude many executable programs from running directly from the media. For example, an executable program may need to write temporary files to the directory from which it was started, such as for scratch space, semaphores to synchronize with other programs or threads, alterations to the operating system registry, or the like. As one consequence of the inability of many executable programs to run directly from protected media, most modern computer operating systems, which were designed to operate natively on a read-write storage device such as a hard drive, are unable to load and execute from a protected medium.

Methods are known in the art that allow data on protected, or read-only, media to be dynamically modified. These methods intercept file and directory read and write requests before they reach the operating system's native CD-ROM file-system driver, and dynamically change the appearance of the data in the directories and files located on the protected media. Such methods are useful, for example in "patching" a bug in a file distributed on a CD-ROM, without the necessity to send the user an updated CD-ROM disk. The file and directory access requests to effect the modifications must be intercepted before they reach the operating system's native CD-ROM file-system driver, because the native CD-ROM file-system driver typically does not normally support write operations and will fail such requests. These prior art methods change only the appearance of the directories, files and data on the protected media as seen by the operating system, and not the characteristics of the native file-system. That is, the operating system, and application programs, will still see a read-only device, with read-only files and directories; the modification changes only the appearance of the data returned.

Other prior art methods, such as those used in Embedded XP product from Microsoft Corporation, use device drivers to emulate a read-write hard drive, using the image of a hard drive on a CD-ROM or other protected media device, in combination with a write cache to emulate write operations to the emulated hard drive. Such methods provide the operating system with a device that has all of the characteristics of a read-write hard drive device. This method of providing read-write functionality using a protected media presents several disadvantages. The method dispenses with some advantages of the protected media, such as the enforcement of read-only file attributes. By emulating a generic read-write device, a user may remove the read-only attribute from a file and then delete that file. This would give the appearance of the file being deleted and of additional free space being created on the emulated hard drive. A related disadvantage of emulating a generic read-write device in this manner is that there is no way to accurately predict in advance the total amount writeable storage that will be needed (i.e., the size of the write cache is not bounded), and thus available resources may be exceeded. For example, a CD-ROM may hold an image file of a 650 megabyte read-write hard drive; if such a devices is emulated on a personal computer that has only 128 megabytes of writeable memory available, the system may run out of write space.

SUMMARY OF THE INVENTION

The present invention relates to a method of emulating a computer storage device having read and write capabilities using a protected media having read-only access. A computer storage device image file including at least one file having a file access attribute is provided on a protected media. A written disk sector database is provided, such as in RAM. A file system filter intercepts file access requests from the operating system. For write requests to files having a read-write access attribute, the write data are directed to the written disk sector database. For read requests, data is supplied from the written disk sector database if the file has previously been written, and is supplied from a corresponding file on the protected media if the file has not previously been written. For write requests, delete requests, or requests to change file access attributes to files having a read-only attribute, the requests are failed.

DETAILED DESCRIPTION OF THE INVENTION

The present invention relates to the use of protected media to emulate a read-write disk drive. As used herein, the term "protected media" refers to computer-readable data storage media that has or enforces read-only characteristics at the time of the hard disk emulation of the present invention. Traditional CD-ROM and DVD-ROM discs are examples of protected media, as are ROM, PROM, EEPROM, and similar read-only solid-state memories. The term also applies to CD-R and CD-RW media (as well as DVD+R, DVD+RW, and other optical storage media of any size, capacity, or format), which may be written one or more times, but at the close of such media session, have the characteristics of read-only media. Protected media also include magnetic storage media that have been rendered read-only, at the time of disk emulation according to the present invention, by the use of a "write protect" feature. The term is to be construed broadly.

Figure 1:
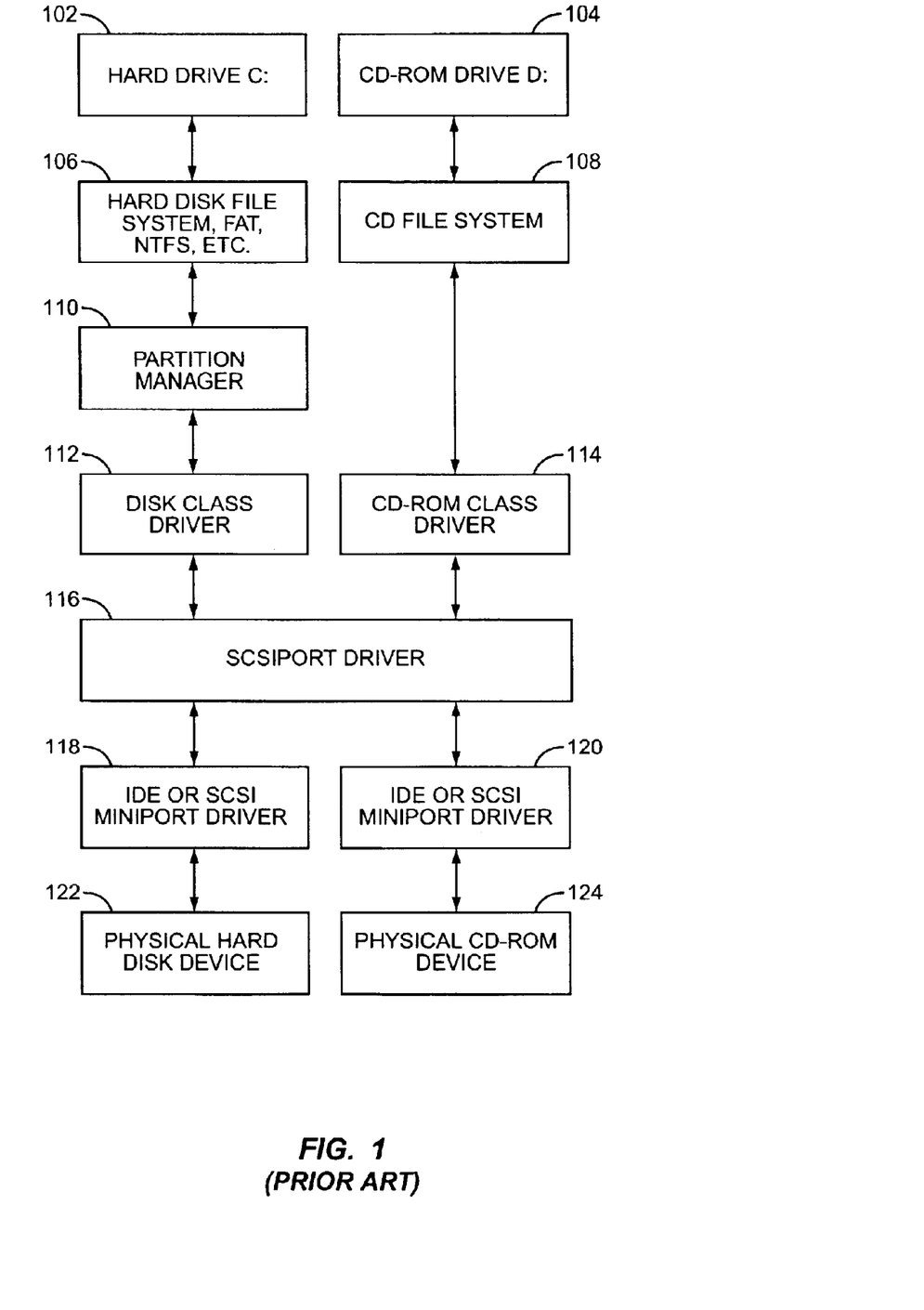
FIG. 1 is a diagram of prior art file system hierarchical filters and drivers.

Computer systems access data from, and store data to, a variety of data storage devices, or drives. Modern operating systems provide a layered hierarchy of support for, and access to, the storage devices, as depicted in FIG. 1. The various layers of device and file system drivers are typically loaded into memory and initialized during a system initialization, or boot, procedure. The layered approach allows the operating system, and other programs running within the operating system environment, to access files stored on the underlying storage media without specific knowledge of the underlying file system or hardware protocols. The use of a layered driver model in modern operating systems enhances the portability of programs, allows programs to execute on a wide range of hardware configurations, and allows for the incorporation of new storage technology into existing computers without the need to update all applications to take advantage of the new hardware. As discussed more fully herein, the layered driver model also makes it possible to change the apparent characteristics of a physical or virtual storage device, or of files located on a storage medium, by providing appropriate filters and drivers in the layer hierarchy.

As used herein, the term "file system filter" refers to filters, device drivers, or other software modules anywhere within the layered hierarchy as depicted in FIGS. 1, 2, 3, and 4. Note that some such filters at the lower levels, i.e., next to the hardware devices, may be independent of any specific file system, and may operate on a block I/O level. This allows the emulated read-write disk drive of the present invention to be implemented on a variety of systems, independent of the specific file system(s) the systems support. Such lower level filters are referred to herein as "file system filters" for consistency; the term is meant to be construed inclusively, and is not limited to filters operating within, or aware of, only certain specific file systems.

FIG. 1 depicts a functional hierarchy of system components and device drivers that translate operating system views of storage devices (i.e., C: or D: drives) to the corresponding physical drive devices. The operating system provides standard interfaces to storage devices for use by application programs, such as the hard drive C: 102 and CD-ROM drive D: 104. Additional drive interfaces such as floppy drives, tape units, and the like are not shown; also, the use of a CD-ROM drive in this explanation is representative of a protected media drive, and is not limiting. The operating system standard drive interfaces 102, 104 allow programs running within the operating system environment to access files on the underlying media. The disk file system driver 106 and CD-ROM file system driver 108 provide services for accessing individual files within the respective file systems on the respective underlying media. The partition manager 110 provides access to data within each of a plurality of partitions that may exist on the hard disk. The disk class driver 112 and CD-ROM class driver 114 provide a means of accessing features that are specific to the underlying devices. The SCSIport driver 116 converts I/O requests into a standard format that is understood by the underlying miniport drivers 118 and 120. The miniport drivers 118, 120 understand the controllers on which the physical devices 122, 124 are attached, and process I/O requests from the SCSIport driver 116. Finally, the physical hard disk drive device 122 and CD-ROM drive device 124 read data from (and, in the case of the hard disk drive 122, store data to) non-volatile magnetic or optical data storage media, respectively.

Figure 2:
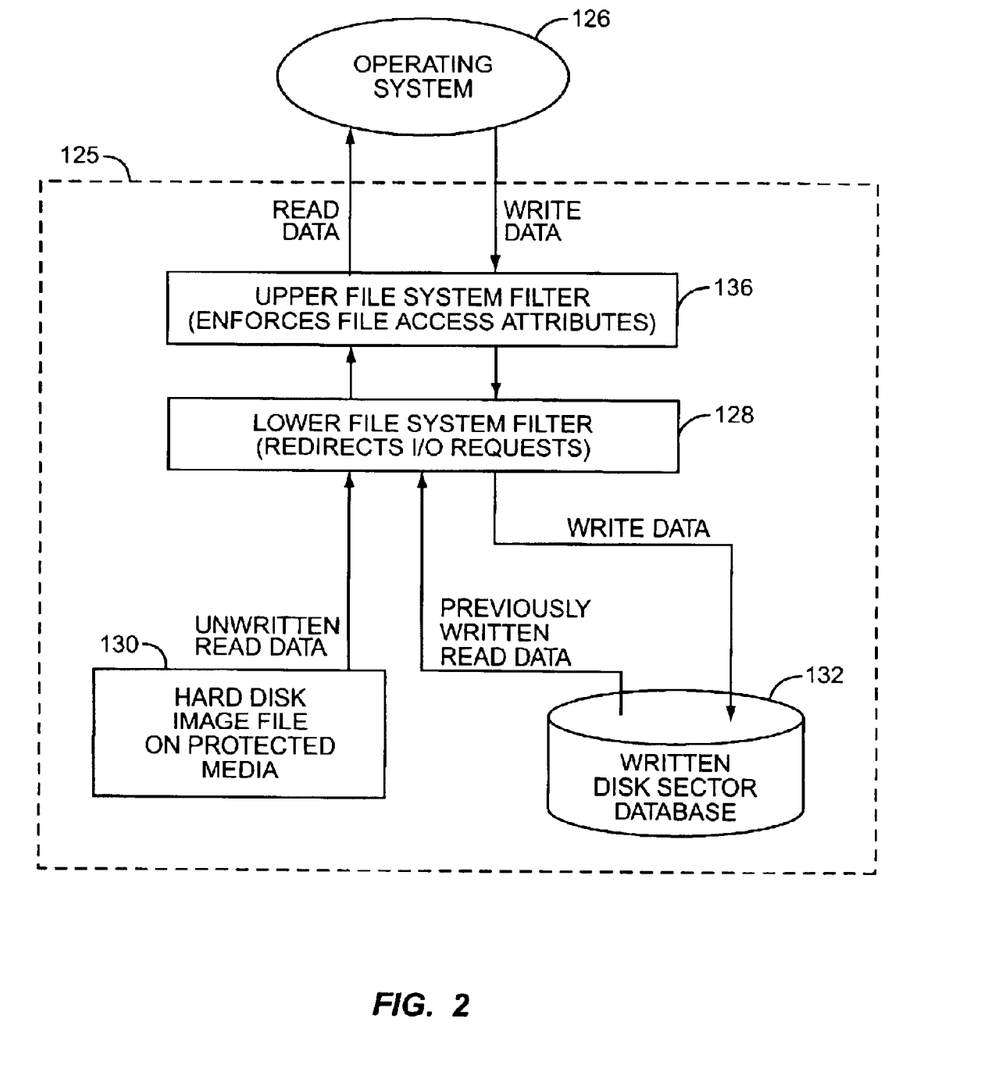
FIG. 2 is a functional block diagram of the emulated read-write hard disk drive of the present invention.

FIG. 2 depicts, in functional block diagram form, an emulated read-write hard disk drive 125 on which file attributes are preserved, according to the present invention. From the point of view of the operating system 126, the emulated read-write disk drive is indistinguishable from a physical hard disk drive (such as logical disk drive 102, implemented by physical hard disk drive 122 and the intervening layered file system and device drivers as depicted in FIG. 1). Both an upper file system filter 136 and a lower file system filter 128, as described in greater detail below, are inserted within the layered hierarchy of file system and device drivers (not shown) associated with the emulated read-write hard disk drive 125. The lower file system filter 128 intercepts read and write requests directed to the emulated drive 125. Initial read requests, that is, read requests directed to files or data not previously written, are serviced from a hard disk image file 130 residing on protected media, such as a CD-ROM. Write requests directed to the emulated hard disk drive 125 are intercepted by the lower file system filter 128, and directed to a written disk sector database 132. The written disk sector database 132 may reside in system memory or alternatively on any read-write storage device, and is capable of storing a quantity of write data corresponding to all read-write files and free space on the hard disk image file 130. The lower file system 128 services subsequent read requests, that is, read requests to files or data that have previously been written to the emulated hard disk drive 125, from the written disk sector database 132.

The upper file system filter 136 monitors and enforces access attributes associated with files and directories on the hard disk image file 130. For example, requests from the operating system 126 to change a read-only file attribute to read-write (which would allow the file to subsequently be deleted, giving the appearance of increasing the amount of free space available on the emulated hard disk drive 125) are intercepted and the operation prevented. In this manner, the total (ultimate) size of the written disk sector database 132 is constrained.

The written disk sector database 132 may be maintained on any available read-write computer data storage device, and is preferably maintained as a logical structure in system memory. The written disk sector database 132 may be organized in any logical structure as necessary or desired, but is preferably implemented as a succession of data storage locations, or "bins," each of a sufficient capacity to store one sector of the hard disk image file 130. Because the maximum size of the written disk sector database 132 is known or calculable (i.e., all read-write files and free space on the hard disk image file 130), the entire written disk sector database 132 may be allocated in advance (such as for example, during system initialization). Alternatively, the written disk sector database 132 may be dynamically constructed, with memory or other storage resources allocated only as data is written.

The written disk sector database 132 is similar in some respects to a disk cache. Disk caches are well known in the art. A disk cache improves perceived I/O performance, reducing the average latency of disk accesses by maintaining recently accessed data in a high-speed hierarchical memory level. Disk caches are populated with data in response to both read and write requests. Disk caches are typically of a fixed size, and when the available storage locations, or bins, are fully utilized, the older or less recently used bins are reallocated to store more recent data. When a reallocated bin contains write data, the underlying storage medium must be updated at some time to reflect the changed data that was written to the cache.

The written disk sector database 132 of the present invention differs from a disk cache in many important respects. The written disk sector database 132 is not populated with data in response to read requests. Rather, it contains only write data; that is, data associated with a write request directed to the emulated read-write hard disk drive 125 (read requests directed to previously written data are serviced from the written disk sector database 132, however, the database 132 is never populated with data in response to a read request). Since the ultimate size of the written disk sector database 132 is known, the storage locations or bins associated with a particular disk sector of the hard drive image file 130 are preferably not reallocated. That is, once a disk sector of a read-write file or free space on the hard disk image file 130 is written, the bin of the written disk sector database 132 allocated to that sector is not subsequently reallocated to another sector of the image file 130. Finally, the written disk sector database 132 does not maintain write data coherency with any underlying mass storage device. In other words, the written disk sector database 132 is the final destination of data written to the emulated read-write hard disk drive 125 of the present invention.

Figure 3:
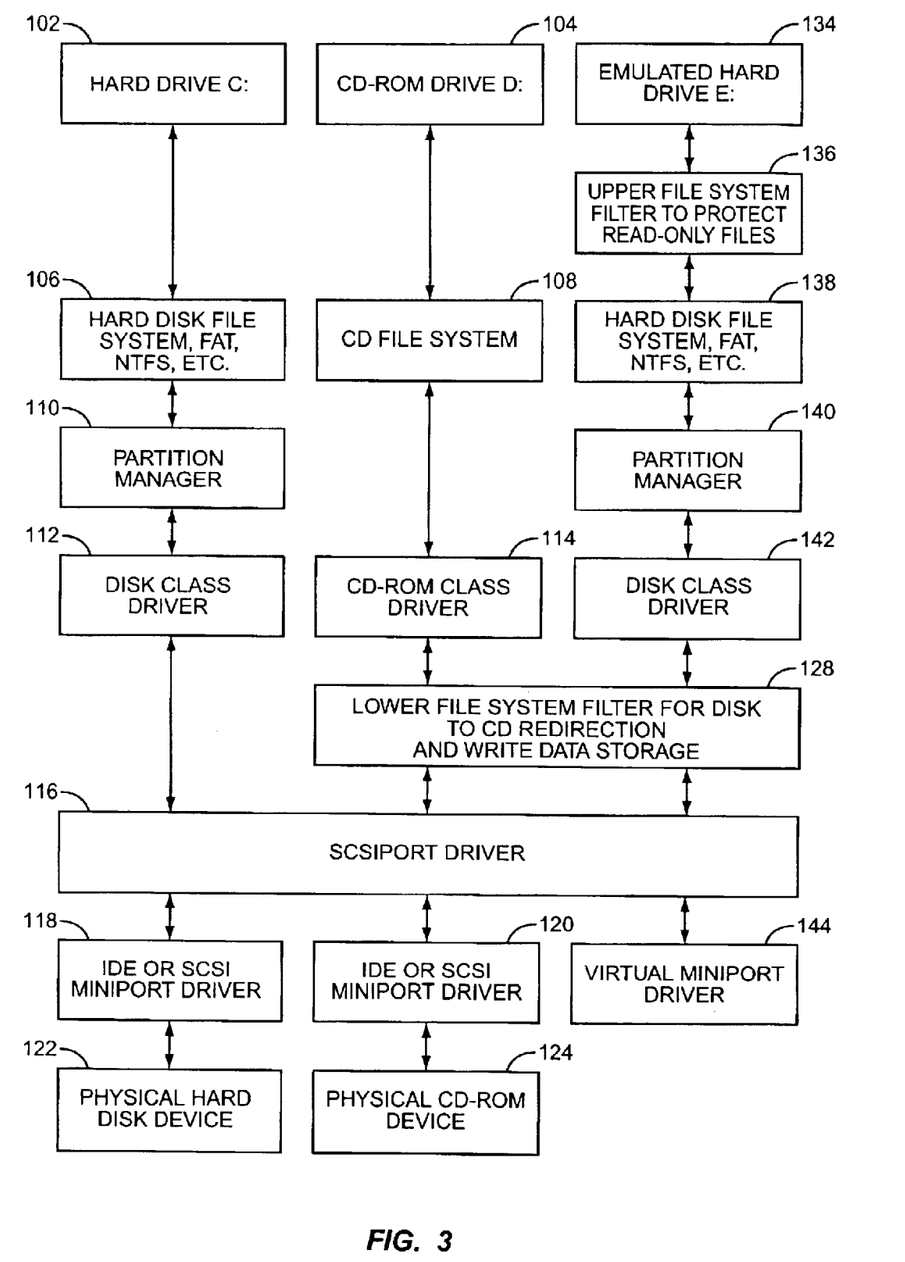
FIG. 3 is a diagram of a file system of a computer implementing one embodiment of the emulated read-write hard disk drive of the present invention.

FIG. 3 depicts one implementation of the emulated read-write hard disk drive 125, within the layered hierarchy of file system drivers and devices previously described. In this embodiment, a virtual miniport driver 144 is added. The virtual miniport driver 144 emulates the basic functionality of a hard disk device by simulating sector read and write operations that are directed to it by the SCSIport driver 116. Also added to the file system hierarchy is the lower file system filter 128. The lower filter 128 intercepts file system requests directed to the virtual miniport driver 144 and provides read-write hard drive emulation. The lower filter 128 accomplishes this by redirecting write operations to the written disk sector database 132 as described previously. The lower filter 128 additionally redirects initial (i.e., not previously written) read requests to the CD-ROM drive, where the read data is retrieved from a hard drive image file 130 located on a protected medium.

Other file system components associated with the emulated read-write hard disk drive 125, such as the operating system interface 134, file system drivers 138, partition manager 140, and disk class driver 142 function in a manner directly analogous to those of a physical hard drive, as well known in the art, and as described above with reference to FIG. 1.

The emulated read-write hard disk drive 125 additionally includes an upper file system filter 136. The upper filter 136 enforces file system attributes on the emulated drive 125. That is, the upper file system 136 intercepts all read and write requests directed to the emulated read-write disk drive 125, and prevents changes to pre-existing read-only files on the emulated drive 125.

As depicted in FIG. 3, the logical structure and operational flow of data to and from the emulated read-write hard disk drive 125 are independent of those relating to a physical hard disk drive, such as drive 122. Thus, the emulated read-write hard disk drive 125 of the present invention may be implemented on a computer that lacks a physical hard disk drive 122, or for which an existing hard disk drive 122 is damaged or otherwise unavailable. The emulated read-write hard disk drive 125 of the present invention may thus find particular utility in disaster recovery, such as recovering from a physical hard disk drive crash, severe virus infection, or the like.

Figure 4:
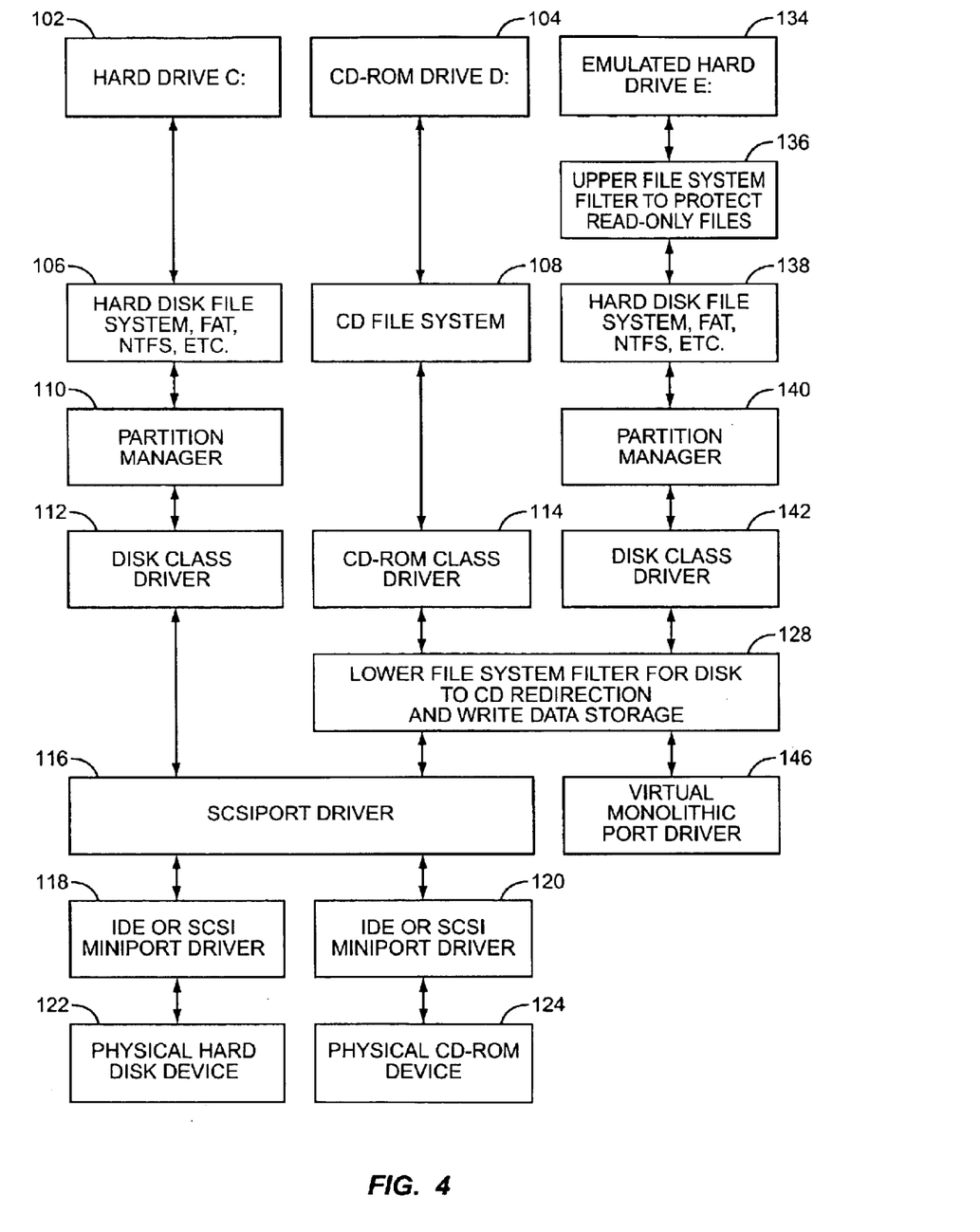
FIG. 4 is a diagram of a computer file system according to a different embodiment of the emulated read-write hard disk drive of the present invention.

FIG. 4 depicts an alternative embodiment of the emulated read-write hard disk drive 125 of the present invention. In this embodiment, a virtual monolithic port driver 146 replaces both the SCSIport driver 116 (in the chain of the emulated read-write hard disk drive 125) and the virtual miniport driver 144. The virtual monolithic port driver 146 provides the functionality of both the SCSIport driver 116 and the virtual mini port driver 144.

Figure 5:
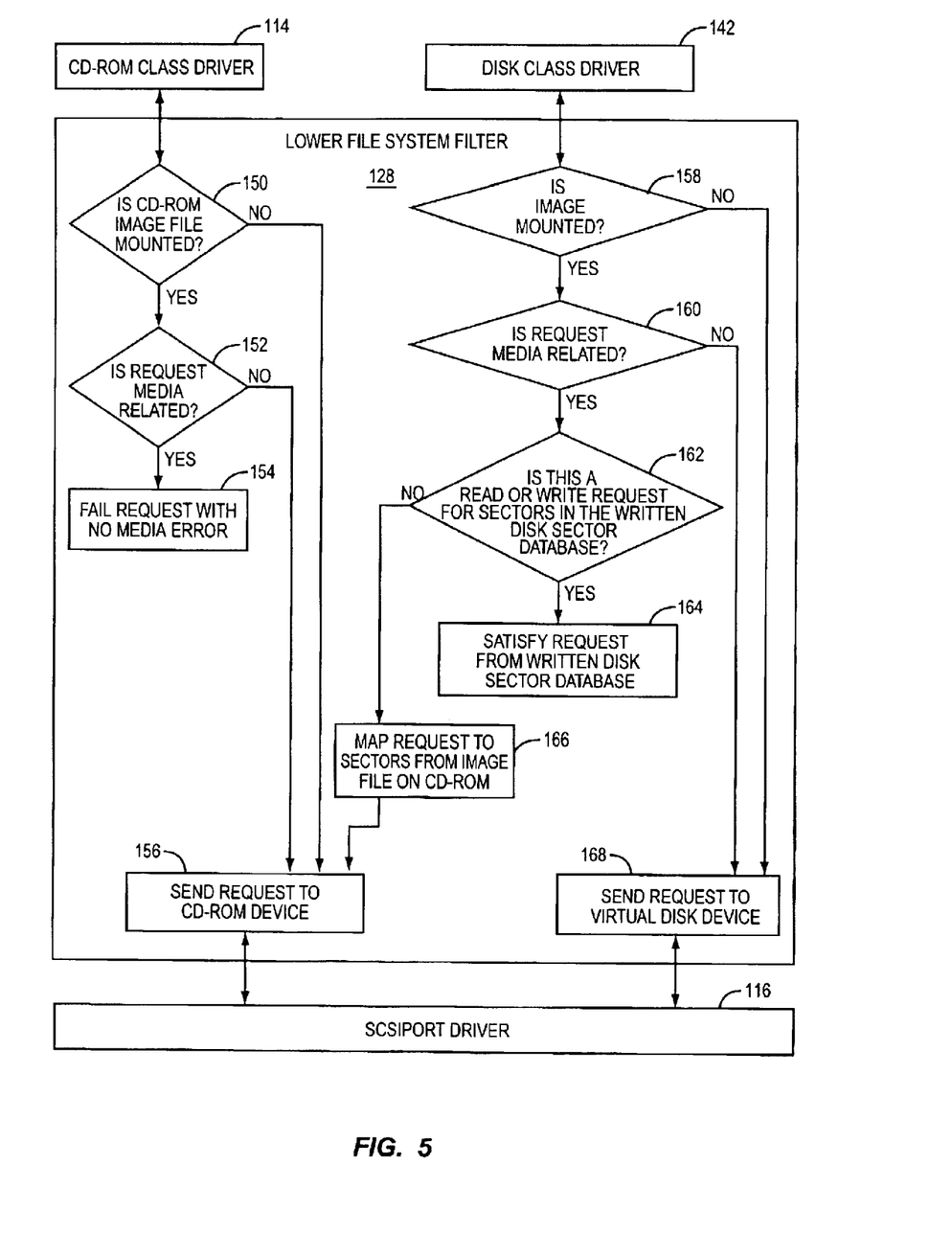
FIG. 5 is a flow diagram representation of a lower file system filter.

FIG. 5 demonstrates the operation of the lower file system filter 128 via a flow diagram. File I/O requests directed to the CD-ROM drive from the CD-ROM class driver 114 are intercepted by the lower file system filter 128. When a hard drive image file 130 is not being used to implement the emulated read-write hard disk drive 125, as determined at step 150, the file I/O requests are passed to the CD-ROM device at step 156. When the emulated read-write hard disk drive 125 is enabled, all I/O requests directed to the CD-ROM drive 124 are examined at step 152 to determine if the I/O request is media related. If so, the request is failed with a "no media" error code at step 154. If the I/O request is not media related, it is passed on to the CD-ROM drive 124 at step 156.

The lower file system filter 128 additionally intercepts requests directed to the emulated read-write disk drive 125, as they flow from the disk class driver 142. Whether hard drive emulation is enabled is determined at step 158, and if not, all I/O requests are directed to the lower disk driver layers at step 168. These I/O requests will eventually be processed by the virtual miniport driver 144, or the virtual monolithic port driver 146. If the emulated read-write hard disk drive 125 is enabled, the I/O request is then examined at step 160 to determine whether it is media related. If the I/O request is not media related, it is passed to the lower disk driver layers at step 168. If the I/O request is media related, it is then examined to determine whether it can be serviced from the written disk sector database 132. That is, a determination is made whether the I/O request is a write operation, or a read operation directed to data that has previously been written. If so, the I/O request is satisfied from the written disk sector database 132 at step 164. If not, that is, if the I/O request is an initial read request (i.e., a read request directed to data that has not been previously written), then the read request is mapped to appropriate sector(s) of the hard disk image file 130 at step 166, and the read request is sent to the CD-ROM device at step 156.

Figure 6:
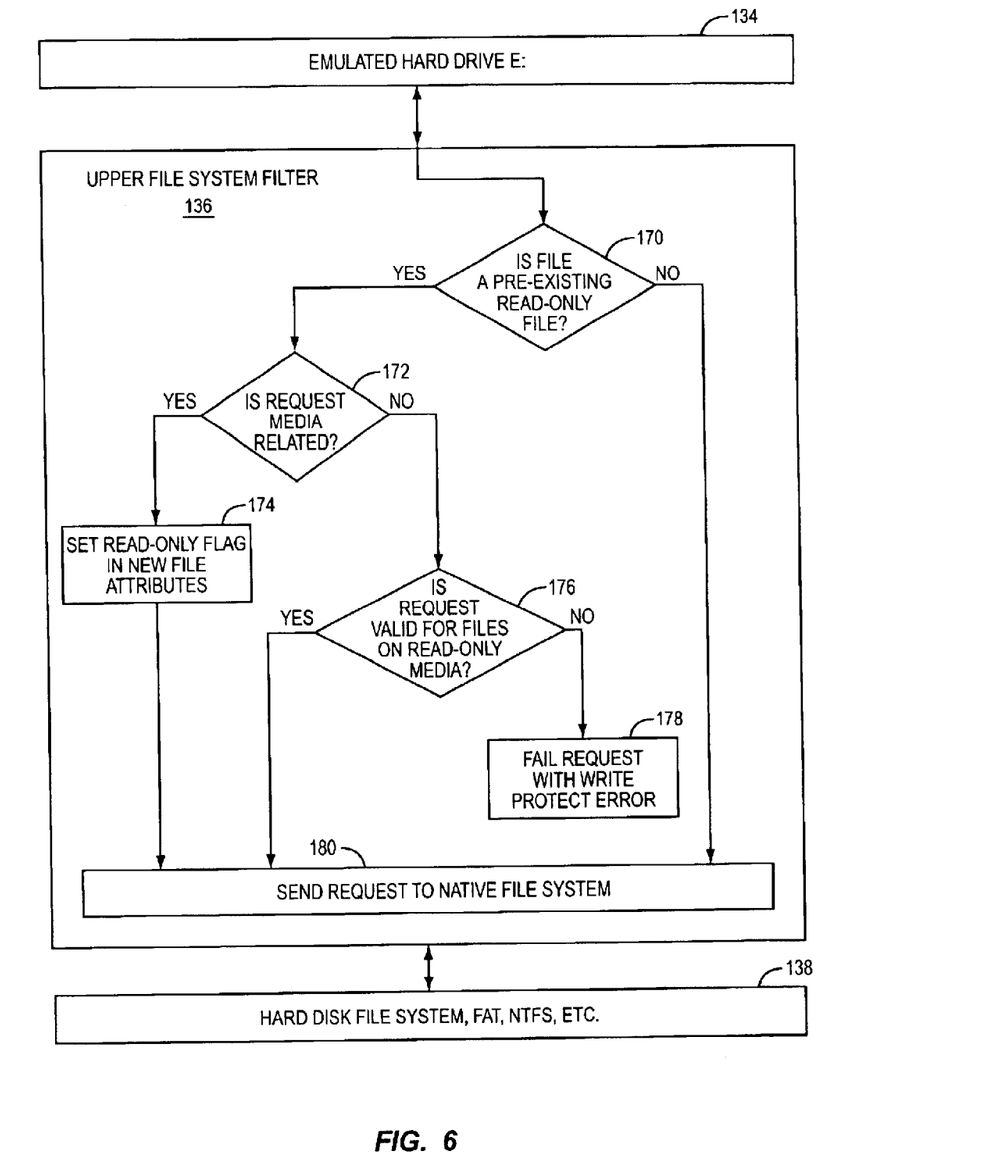
FIG. 6 is a flow diagram representation of an upper file system filter.

FIG. 6 depicts the operation of the upper file system filter 136 via a flow diagram. The upper file system filter 136 enforces file attributes of pre-existing files on the emulated read-write hard disk drive 125 by intercepting I/O requests directed to the emulated drive 125 by the operating system interface 134. The upper file system filter 136 first examines the I/O request to determine if it is for one of the pre-existing files on the emulated drive 125 (i.e., if the file exists on the hard disk image file 130), and if the file needs to be protected, at step 170. Whether the requested file needs to be protected may be determined at step 170 in a variety of ways, such as:

using a pre-created list of fully qualified file names;

using the file attributes;

using the file date/time stamp;

using the file location within the directory hierarchy; or any combination of these methods.

If the intercepted I/O request is directed to a file that is not identified as a protected file, the request is passed on to the lower level file system drivers at step 180. If the I/O request is directed to a file identified as one in need of protection, then the request is further examined at step 172 to determine if it is a request to change the access attributes of the file. If the request would alter the read-only attribute for the protected file, then the request packet is altered at step 174 to force the read-only attribute to ON in order to preserve the read-only property associated with the file. The altered I/O request is then sent to the lower file system drivers at step 180. If a determination is made at step 172 that the I/O request will not alter the access attributes of the protected file, then the request is further examined at step 176 to determine if the request is valid for files on a read-only media. If the request is valid, it is sent on to the lower level file system drivers at step 180. If the I/O request is determined to be not valid for a file on a read-only media (e.g., a request to delete the file), then the request is failed at step 178 with an error code signaling an attempt to write to a write-protected media.

Figure 7:
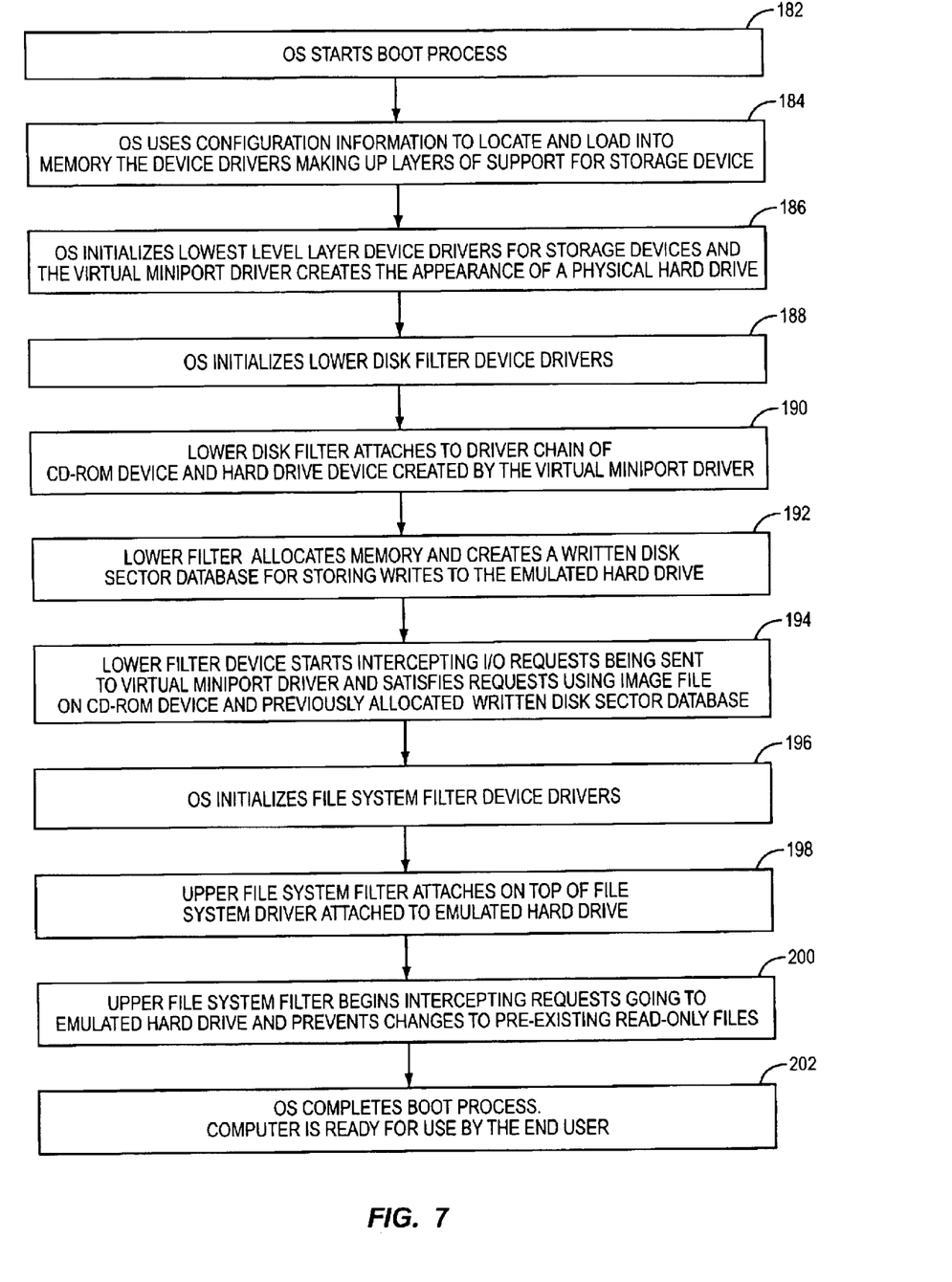
FIG. 7 is a flow diagram of a boot process by which the emulated read-write hard disk drive of the present invention may be implemented and initialized.

FIG. 7 depicts a method by which a computer system may be configured to implement an emulated read-write hard disk drive 125 according to the present invention. The operating system boot process (step 182) begins when the POST (Power On Self Test) routine in the ROMBIOS reads a boot sector containing bootstrap code into memory, and then transfers control of the CPU to the bootstrap code. The operating system bootstrap code reads configuration information from the boot device and uses this information to locate and load all of the device drivers that make up the layers of support for the storage devices (step 184). The operating system initializes each device driver layer, starting with the layer closest to the physical storage device (step 184). During this initialization step, the virtual SCSI miniport driver 144 (FIG. 3) or virtual monolithic port driver 146 (FIG. 4) reports finding a physical hard drive, and then emulates the functionality of a physical hard drive to satisfy requests from the operating system to the virtual device. The operating system then initializes the lower file system filter 128 (step 188) and attaches the filter 128 to the file system chain of the CD-ROM drive and the virtual hard disk drive (step 190). The lower file system filter 128 then creates the written disk sector database 132 by allocating space in writeable random access memory or on other writeable storage medium (step 192). If desired, the written disk sector database 132 may be fully allocated at this point, as its total size is known or may be calculated as the sum of sectors on the hard disk image file 130 allocated to either read-write files or free space. Alternatively, the written disk sector database 132 may be initialized, with memory allocated to it dynamically on an as-needed basis. The lower file system filter 128 begins intercepting I/O requests directed to the emulated read-write hard disk drive 125 (step 194) and processes the I/O requests using sectors from the hard disk image file 130 on the CD-ROM drive in combination with the written disk sector database 132, as described above. The operating system continues to initialize file system device drivers (step 196), and eventually attaches the upper file system filter 136 into the I/O request path for the emulated read-write hard disk drive 125 (step 198). When the upper file system filter 136 has been initialized and attached to the emulated hard drive 125, it begins intercepting requests to the emulated hard drive 125 (step 200) and prevents changes to pre-existing read-only files on the emulated drive 125. The operating system then completes the boot process, and the computer system is ready for use by the user (step 202).

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. A method of emulating a computer storage device having read and write capabilities using a protected media having read-only access, comprising:

providing a computer storage device image file on said protected media, said image file including at least one file having a file access attribute;

providing a written disk sector database;

intercepting file access requests from the operating system of said computer; and for write requests to read-write files, directing the write data to said written disk sector database;

for read requests to files, providing data from said written disk sector database if said file has previously been written, and providing data from a corresponding file on said protected media if said file has not previously been written; and for write requests, delete requests, or requests to change file access attributes to read-only files, failing said requests.

2. The method of claim 1 wherein said written disk sector database is maintained in memory in said computer.

3. The method of claim 1 wherein said computer storage device image file includes elements selected from the group consisting of read-only files, read-write files, and free space.

4. The method of claim 1 wherein said written disk sector database comprises a plurality of records, each record corresponding to a sector of said computer storage device image file and operative to store at least the amount of data of said corresponding sector.

5. The method of claim 4 wherein said written disk sector database comprises a number of said records at least as large as the number of disk sectors allocated to read-write files and free space on said computer storage device image file.

6. The method of claim 1 wherein said read-write files and read-only files are determined by a method selected from the group consisting of using a pre-created list of fully qualified file names, using the file attributes, using the file date/time stamp, and using the file location within the directory hierarchy.

7. An emulated mass storage device for a computer, comprising:
- a computer storage device image file on a protected medium operative to supply data from read-only files, data from the initial state of read-write files, and free space for said emulated mass storage device; and
- a written disk sector database operative to store data written to read-write files and free space on said emulated mass storage device, and operative to supply data previously written to read-write files on said emulated mass storage device, said written disk sector database constrained in size to the total number of sectors allocated to read-write files and free space on said computer storage device image file, without reallocating any storage among said sectors.

8. The emulated mass storage device of claim 7, further comprising a file system filter operative to intercept file system requests from the operating of said computer directed to said emulated mass storage device.

9. The emulated mass storage device of claim 8 wherein said file system filter diverts write data for write requests to files with read-write attributes to said written disk sector database.

10. The emulated mass storage device of claim 8 wherein said file system filter satisfies read requests to files with read-write attributes from said written disk sector database if said files have previously been written, and if said files have not previously been written, satisfies said read requests from said computer storage device image file.

11. The emulated mass storage device of claim 8 wherein said file system filter fails requests to write, to delete, or to alter the file access attributes, of files having a read-only access attribute.

12. A computer, comprising:
- an operating system; and
- an emulated mass storage device comprising:
  - a computer storage device image file on a protected medium, said image file including data organized into a plurality of files, each file having an access attribute;
  - a fixed-size, non-reallocating written disk sector database operative to store data written to said emulated mass storage device; and
  - a file system filter operative to intercept file access requests from said operating system and to service said requests via said written disk sector database and said computer storage device image file, said file system filter enforcing said access attributes by failing requests to write, delete, or change the access attributes of read-only files.

13. The computer of claim 12 wherein said written disk sector database has a predetermined maximum size.

14. The computer of claim 13 wherein the predetermined size of said written disk sector database corresponds to the number of sectors in said computer storage device image file that are allocated to files with a read-write attribute or free space.

15. The computer of claim 12 wherein storage locations in said written disk sector database are not reallocated.

* * * * *